United States Patent
Yoshida et al.

(10) Patent No.: US 6,366,458 B1
(45) Date of Patent: Apr. 2, 2002

(54) DOCKING UNIT FOR PORTABLE ELECTRONIC DEVICE AND LOCKING METHOD OF DOCKING UNIT

(75) Inventors: Tatsuo Yoshida, Kanagawa; Akio Karasawa, Nagano, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/104,282

(22) Filed: Jun. 25, 1998

(30) Foreign Application Priority Data

Jun. 30, 1997 (JP) .......................................... P09-174175
Jun. 30, 1997 (JP) .......................................... P09-174176

(51) Int. Cl.[7] .............................. G06F 1/16; H05K 7/02
(52) U.S. Cl. ....................................... 361/686; 710/102
(58) Field of Search ................................ 361/686, 724, 361/725, 727; 710/102

(56) References Cited

U.S. PATENT DOCUMENTS

| | | | |
|---|---|---|---|
| 5,313,596 A | * 5/1994 | Swindler et al. | ............ 395/326 |
| 5,323,291 A | * 6/1994 | Boyle et al. | ................. 361/686 |
| 5,450,271 A | 9/1995 | Fukushima et al. | |
| 5,477,415 A | * 12/1995 | Mitcham et al. | ............ 361/686 |
| 5,530,620 A | * 6/1996 | Sangveraphunsiri | ........ 361/686 |
| 5,557,562 A | * 9/1996 | Yoshiharu et al. | ........... 361/686 |
| 5,640,301 A | * 6/1997 | Roecker et al. | .............. 361/686 |
| 5,664,118 A | * 9/1997 | Nishgaki et al. | ............. 395/283 |
| 5,737,541 A | * 4/1998 | Shimizu et al. | .............. 361/686 |
| 5,751,547 A | * 5/1998 | Honda et al. | ................ 361/686 |
| 5,822,185 A | * 10/1998 | Cavello | ........................ 361/686 |
| 5,864,294 A | * 1/1999 | Hsu et al. | ..................... 361/686 |
| 5,933,321 A | * 8/1999 | Ruch et al. | ................... 361/686 |

* cited by examiner

Primary Examiner—Lynn D. Feild
(74) Attorney, Agent, or Firm—Rader, Fishman & Grauer PLLC; Ronald P. Kananen

(57) ABSTRACT

A docking unit for a portable electronic device with which it is possible to establish electrical connection of a portable electronic device surely and easily. A docking unit for electrically connecting a portable electronic device to external devices by having the portable electronic device set engage/disengageably thereon using a connector has a base part for supporting the portable electronic device, positioning means for positioning the portable electronic device in a predetermined position on the base part as the portable electronic device is moved over the base part, and operating means, having and engaging part for engaging with the portable electronic device means, for holding the positioned portable electronic device using the engaging part.1

30 Claims, 9 Drawing Sheets

DOCKING UNIT FOR PORTABLE ELECTRONIC DEVICE AND LOCKING METHOD OF DOCKING UNIT

DESCRIPTION OF THE RELATED ART

In a portable electronic device such as for example a portable computer, because importance is attached to portability, there is a limit to the number of external devices and communications devices and the like that can be built into the portable electronic device itself. And when a portable computer is used on a table, individually connecting various cables such as a printer cable, a monitor cable and a communication cable and the like and an a.c. adaptor to the computer can be extremely complicated. For this reason, an operator sometimes uses a portable computer docking unit, also called an expansion unit or docking station, for expanding the capabilities of the portable computer.

Figure 1:
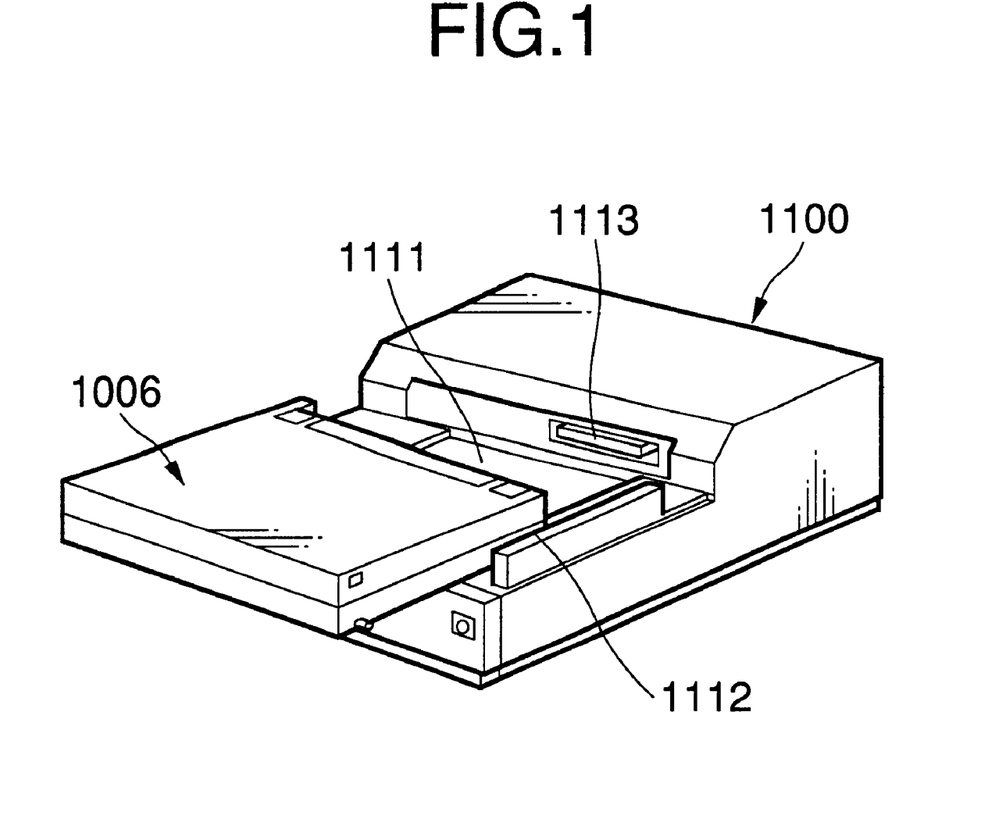
FIG. 1 is a perspective view showing a related art portable computer docking unit.

FIG. 1 shows a docking unit 1100 of this kind and a portable computer 1006. By the portable computer 1006 being slid onto the docking unit 1100 along guides 1112, a connector 1113 of the docking unit 1100 and a connector of the portable computer 1006 are connected. At this time the portable computer 1006 slides along a support part 1111 of the docking unit 1100. A key mechanism for locking the portable computer to the docking unit is disclosed in Japanese Unexamined Patent Publication No. H.6-14909.

SUMMARY OF THE INVENTION

However, if when an operator is operating a portable computer which has been set on this kind of docking unit the portable computer is mistakenly removed from the docking unit, because the connector of the portable computer is disconnected from the connector of the docking unit, the accident of processing work in progress on the computer being suddenly interrupted occurs. It is therefore an object of the present invention to solve this problem and provide a docking unit for a portable electronic device and a locking method for this docking unit which when an operator using a portable electronic device set on the docking unit tries to remove the portable electronic device from the docking unit can ensure that the portable electronic device is removed safely after processing in the electronic device is finished.

To achieve this and other objects, the invention provides a docking unit for having a portable electronic device engage/disengageably set thereon using a connector and electrically connecting the portable electronic device to an external device, comprising: a base part for supporting the portable electronic device; positioning means for positioning the portable electronic device in a predetermined position on the base part as the portable electronic device is moved on the base part; and operating means, having an engaging part for engaging with a portable electronic device, for holding the positioned portable electronic device on the base part using the engaging part.

According to the invention, a portable electronic device is placed on the base part of the docking unit. The positioning means positions the portable electronic device in a predetermined position on the base part as the portable electronic device is moved. The operating means has an engaging part for engaging with the portable electronic device and holds the positioned electronic device using the engaging part. As a result, using the positioning means the portable electronic device can be correctly positioned in a predetermined position on the base part and by using the operating means it can be simply and surely held on the base part. By this means, damage to connectors can be prevented and furthermore the portable electronic device, and external devices by way of the docking unit, can be electrically connected surely by way of connectors.

As described above, with this invention, electrical connection of a portable electronic device can be established surely and easily. Also, the electronic device can be removed safely from the docking unit after processing in the electronic device is finished.

DETAILED DESCRIPTION OF THE PREFERRED EMBODIMENTS

A preferred embodiment of the invention will now be described in detail on the basis of the accompanying drawings.

Figure 2:
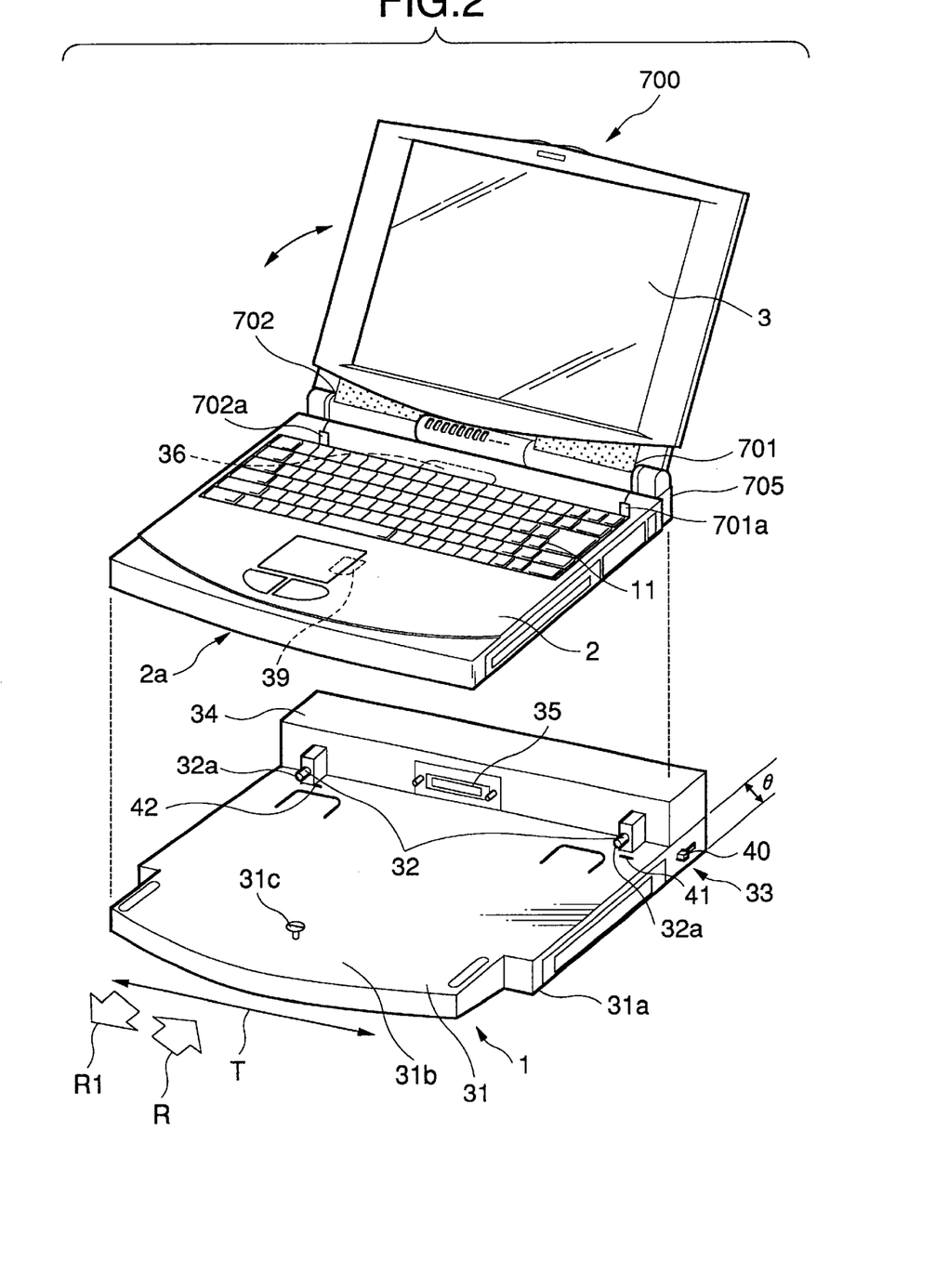
FIG. 2 is a perspective view showing a preferred embodiment of a portable electronic device docking unit according to the invention and a portable electronic device.

FIG. 2 shows a docking station 1 for a portable. electronic device and a portable computer 700 as a portable electronic device to be set on the docking station 1. The portable computer 700 has a computer body 2, display means 3 and a keyboard 11. For the display means 3, for example a liquid crystal display device (LCD) can be employed. This display means 3 is attached to the computer body 2 in such a way that it can be opened and closed. Also,.although it is not shown in FIG. 2, an external device such as a mouse, which is pointing device, can be connected to the computer body 2.

Figure 3:
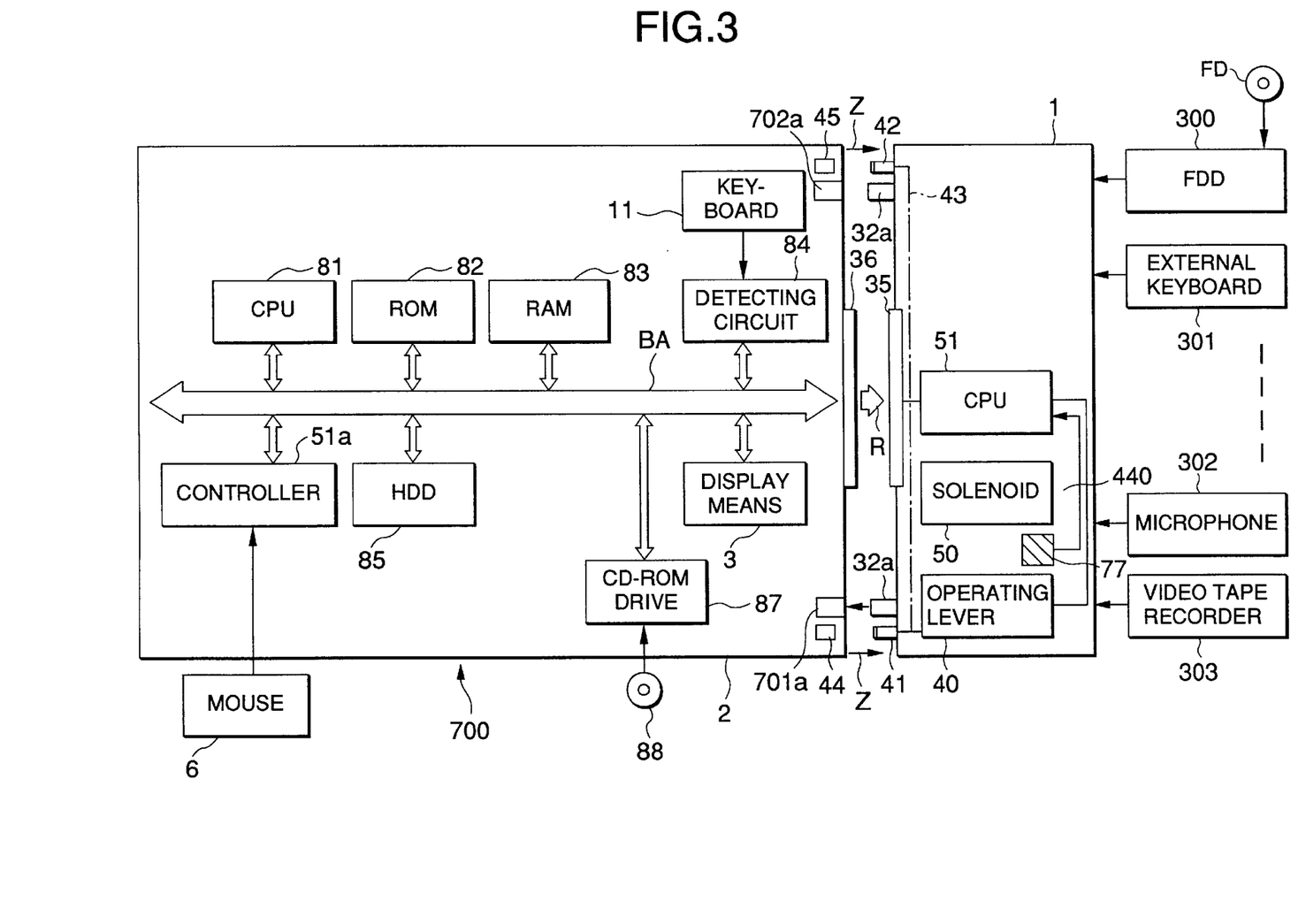
FIG. 3 is a block diagram showing schematically the construction of the portable electronic device and the docking unit of FIG. 2.

FIG. 3 shows the system construction inside the computer body 2 of this computer 700 and the docking station 1. The computer body 2 has for example a hard disc drive (HDD)

85, a CD-ROM (Compact Disc Read-Only Memory) drive 87, a detecting circuit 84 of the keyboard 11, a CPU (Central Processing Unit) 81, a ROM (Read-Only Memory) 82, a RAM (Random Access Memory) 83 and a controller 51a.

A mouse 6 is connected to the controller 51a. The controller 51a, the ROM 82, the RAM 83, the detecting circuit 84, the hard disc drive 85 and the CD-ROM drive 87 for a CD-ROM 88 are connected to the CPU 81 by a bus BA. The CPU 81 executes various processing according to programs stored in the ROM 82. Data and programs necessary for the CPU 81 to execute this processing are stored in the RAM 83. The detecting circuit 84 detects operations of the keyboard 11 and outputs corresponding detection signals to the CPU 81.

The hard disc drive 85 stores programs and data to be processed by the CPU 81. The CPU 81 can read graphic data such as a pointer stored in the ROM 82 and output it to the display means 3 to be displayed.

Next, the docking station 1 will be described. The docking station 1 shown in FIG. 2 and FIG. 3 is a docking unit for use with the portable computer 700 and is used to overcome the problem that because the portable computer 700 is small there is a limit to the size and number of devices that can be built into it. It may also be called an expansion unit.

As shown in FIG. 3, the docking station 1 can electrically connect the computer 700 with external devices such as for example a floppy disc drive 300, an external keyboard 301, a stereo microphone 302 and a video recorder 303. And as shown in FIG. 2 the docking station 1 has a base part 31, two positioning means 32, 32 and one operating means 33. The computer 700 shown in FIG. 2 can be engage/disengageably set on the base part 31.

When this computer 700 is to be engage/disengageably set on the base part 31, by the computer 700 being placed on the base part 31 and then moved over the base part 31 in the direction of the arrow R in FIG. 2, the computer 700 can be electrically connected to the docking station 1 using connectors 35, 36. The base-part 31 is preferably inclined at a predetermined angle θ, for example about 7.5° to the bottom face 31a of the docking station 1. This is to make it ergonomically easier for an operator to see the display means 3 of the computer 700 when the computer 700 has been set on the base part 31 of the docking station 1.

The positioning means 32, 32 are disposed so as to face a first part 701 and a second part 702 of a rear end part 705 of the computer 700. That is, the positioning means 32, 32 are positioned respectively at left and right end positions of a projecting part 34 of the docking station 1, and in the middle of the projecting part 34 a for example female connector 35 of the docking station 1 side is disposed. With respect to this, a male connector 36 is disposed in the middle of the rear end part 705 of t he computer 700. By the male connector 36 being connected to the connector 35 of the docking station 1, the computer 700 can be electrically connected to the docking station 1 side.

Figure 8:
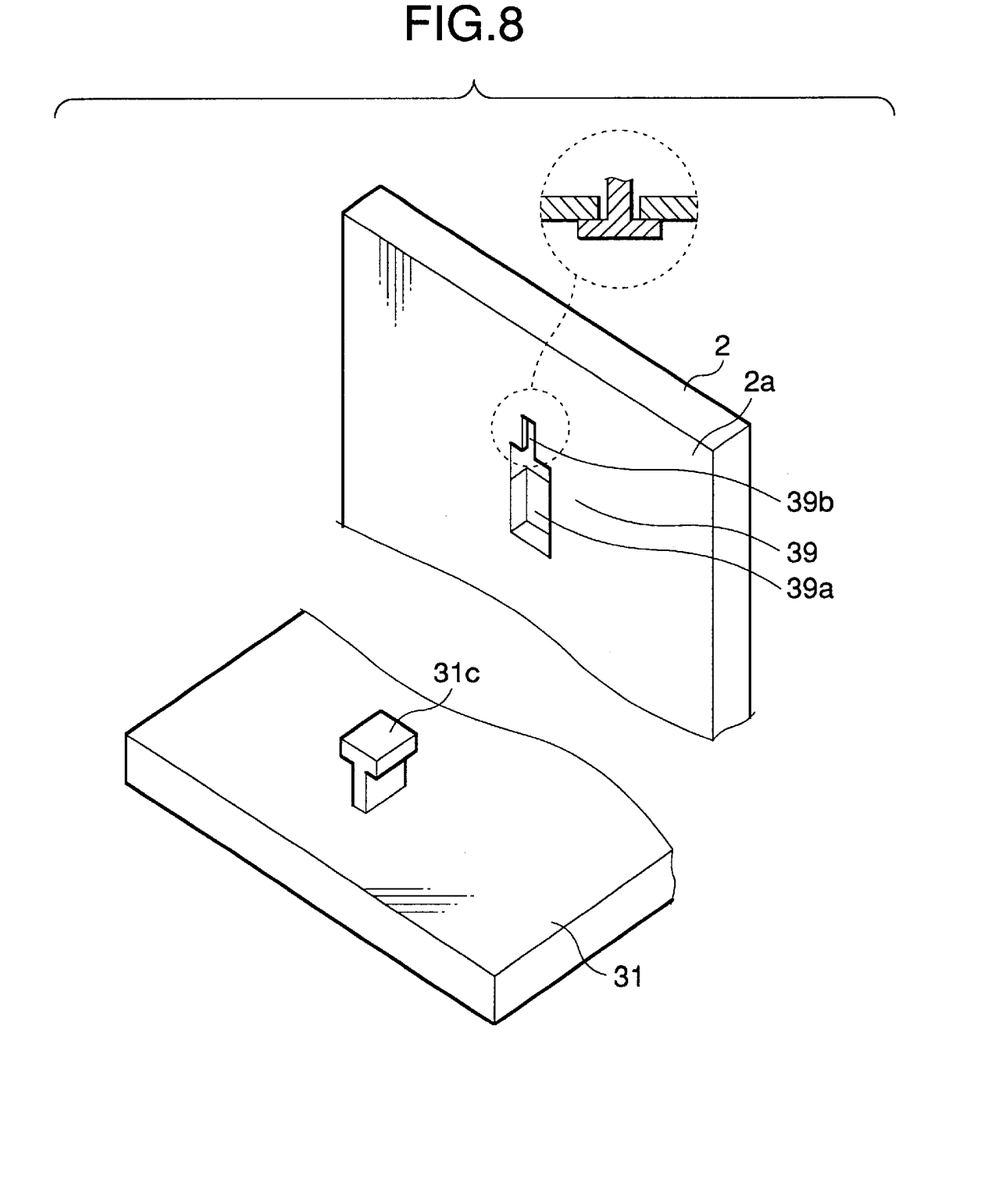
FIG. 8 is a perspective view showing an example of a projecting part of a docking station and a positioning hole in a computer.

The positioning means 32, 32 are so constructed that when an operator places the computer 700 on an end part 31b of the base part 31 and moves it in the direction of the arrow R, as the rear end part 705 of the computer 700 approaches the projecting part 34, guides 32a, 32a of the positioning means 32, 32 fit into a hole 701a in the first part 701 and a hole 702a of the second part 702 of the computer 700. By this means, positioning of the computer 700 for connection of the connectors 35, 36 can be carried out accurately without the computer 700 slipping in the left-right T direction of the docking station 1 or in the Z direction perpendicular to the T direction. As shown in FIG. 2 and FIG. 8, a projecting part 31c is provided projecting upward from a central part of the end part 31b of the docking station 1. The projecting part 31c is substantially T-shaped when seen in cross-section, and this projecting part 31c engages with a positioning hole 39 formed in the bottom face 2a of the computer body 2 of the computer 700.

The operating means 33 shown in FIG. 2 and FIG. 3 has one operating lever 40 for manual operation, a first engaging member 41 (engaging part), a second engaging member 42 (engaging part), and a connecting member 43. The operating lever 40 is for pulling the first engaging member 41 and the second engaging member 42 back in the Z direction. By moving this operating lever 40 in the Z direction, the first engaging member 41, the connecting member 43 and the second engaging member 42 can be pulled back in the Z direction. The Z direction is parallel with the R direction. As shown in FIG. 3 and FIGS. 7A through 7D, the first engaging member 41 can engage with a hole 44 formed in the bottom face 2a of the computer body 2 of the computer 700. Similarly, the second engaging member 42 can engage with a hole 45 formed in the bottom face 2a of the computer body 2. In FIG. 3, as mentioned above, the computer body 2 has a connector 36 and the docking station 1 side has a connector 35.

Figure 4:
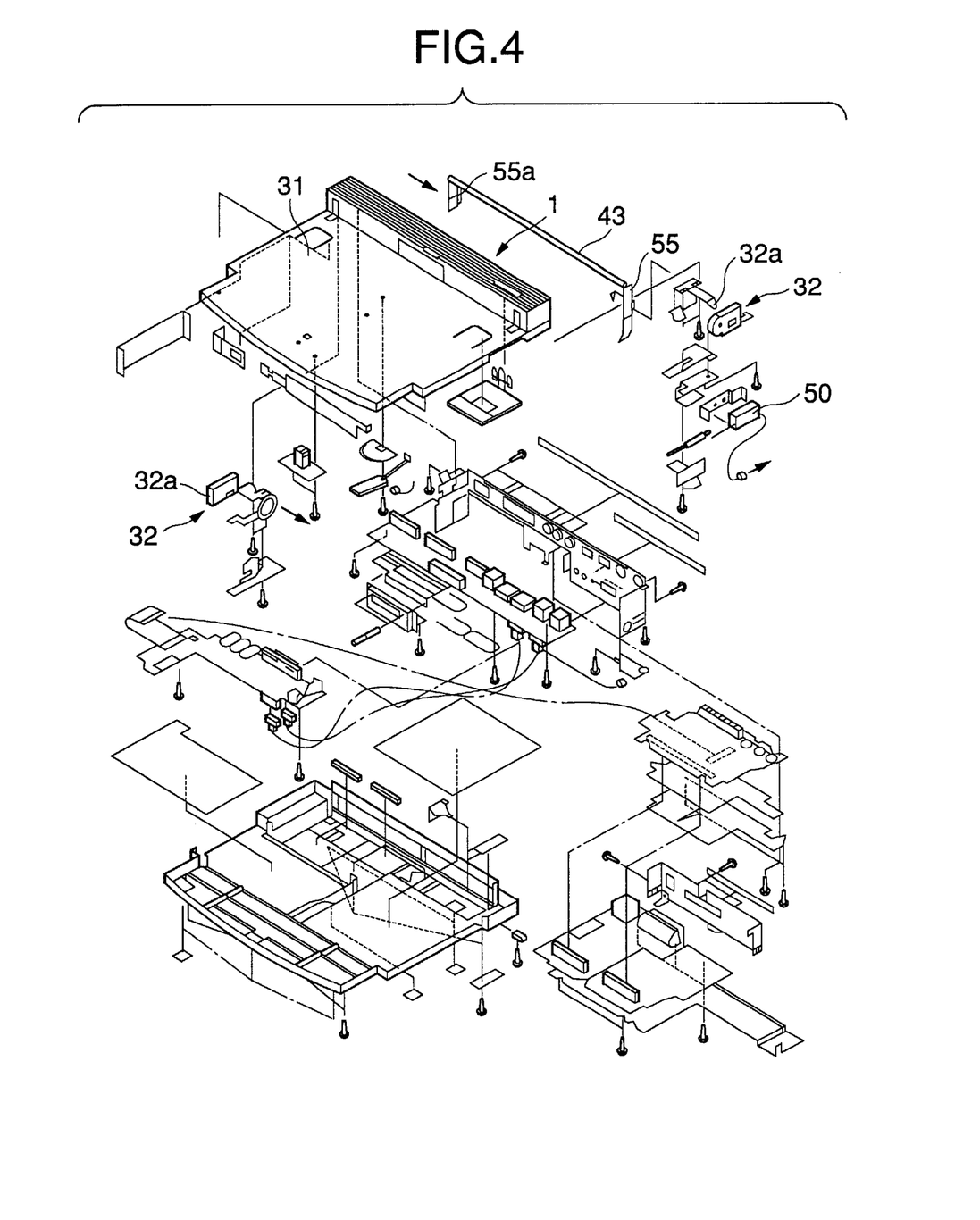
FIG. 4 is an exploded perspective view showing an example of the internal construction of a docking unit according to the invention.

FIG. 4 is a perspective view showing an example of the internal construction of the docking station 1 shown in FIG. 2 and FIG. 3. In FIG. 4, the connecting member 43, the positioning means 32, 32, the base part 31, a solenoid 50 and members 55, 55a are shown. The docking station 1 has the solenoid 50 shown in FIG. 3 and FIG. 4 and a CPU (Central Processing Unit) 51 for feeding commands to this solenoid 50. The CPU 51 is electrically connected to the connector 35. When the solenoid 50 is turned on, it exerts a force which forcibly prevents movement of the operating lever 40 from a hold position (or lock position) to a release position, as shown in FIG. 5.

Figure 5:
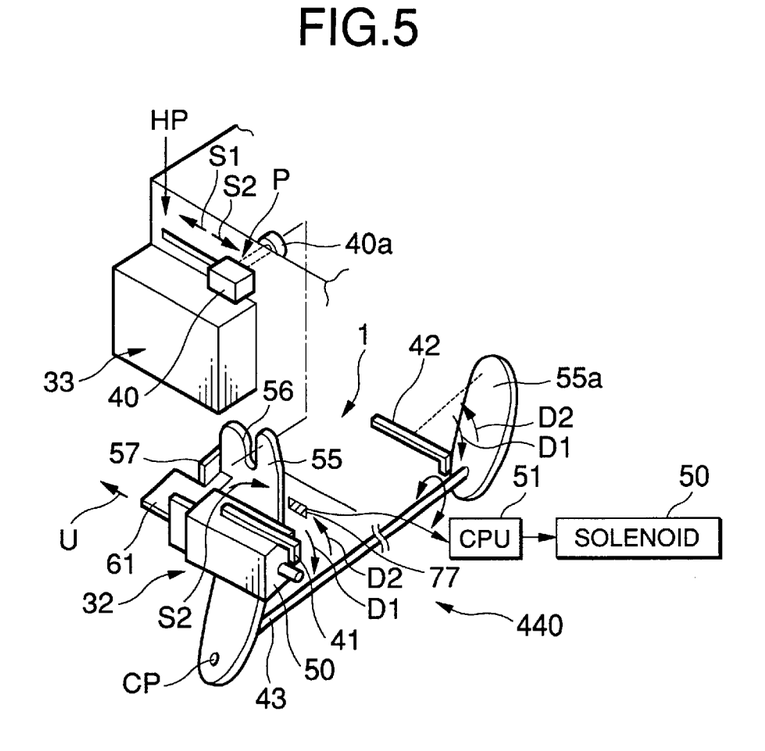
FIG. 5 is a perspective view showing, inverted, an example of operating,means, positioning means and locked state releasing means of a docking unit according to the invention.

FIG. 5 shows the operating lever 40 of the operating means 33 shown in FIG. 2 and FIG. 3, one of the positioning means 32, the first engaging member 41 and the second engaging member 42, the connecting member 43 and the members 55, 55a. The operating lever 40 can be moved manually by an operator in directions S1 and S2 between a hold position (lock position) HP and a release position P. An engaging part 40a of the operating lever 40 engages with a hole 56 in the member 55. When the operating lever 40 is moved in the direction S1 from the release position P to the hold position HP, as shown in FIG. 5 and FIGS. 7A through 7D the first engaging member 41 and the second engaging member 42 connected by the connecting member 43 are simultaneously lifted upward in the direction D1.

When the first engaging member 41 and the second engaging member 42 are lifted in the direction D1 like this, as shown in FIGS. 7A through 7D they respectively enter the two holes 44, 45 in the computer body 2. When with the first engaging member 41 and the second engaging member 42 thus fitted in the holes 44, 45 the solenoid 50 shown in FIG. 5 is then turned on, a moving piece 61 of the solenoid 50 of FIG. 5 engages with and locks a projection 57 of the member 55, and in this locked state the member 55 cannot rotate about its center of rotation CP in the direction S2. When the moving piece 61 of the solenoid 50 projects in the direction U, that is, when the operating lever 40 is in the hold position HP, the member 55 cannot move in the direction S2 and the first and second engaging members 41, 42 are held in an upper position in the direction D1. In this state the first engaging member 41 and the second engaging member 42 are respectively fitted in the holes 44, 45 of the computer body 2 shown in FIG. 3. When the operating lever 40 has been positioned in the hold position HP the computer 700 of FIG. 2 is completely fixed to the docking station 1 and the connectors 35, 36 are electrically connected, and because as a result of the operation of the solenoid 50 the member 55 of FIG. 5 cannot move in the direction S2, the first engaging member 41 and the second engaging member 42 are held in position surely fitted in the holes 44, 45 of the computer 700. Thus the computer 700 can be surely fixed to the docking station 1.

The solenoid 50 thus performs the role of an actuator for rendering the first engaging member 41 and the second engaging member 42 immovable and can lock and maintain a state wherein the operating means 33 holds the portable computer.

Next, the operation of docking the computer 700 with the docking station 1 using the positioning means 32, 32 and the operating means 33 of FIG. 2 and FIG. 3 will be described with reference to FIGS. 7A through 7D and FIG. 8. FIGS. 7A through 7D show a procedure wherein the computer 700 is placed on the base part 31 of the docking station 1 of FIG. 2 and slid in the R direction and the connector 36 of the computer 700 is surely electrically connected to the connector 35 of the docking station 1.

Figure 7A:
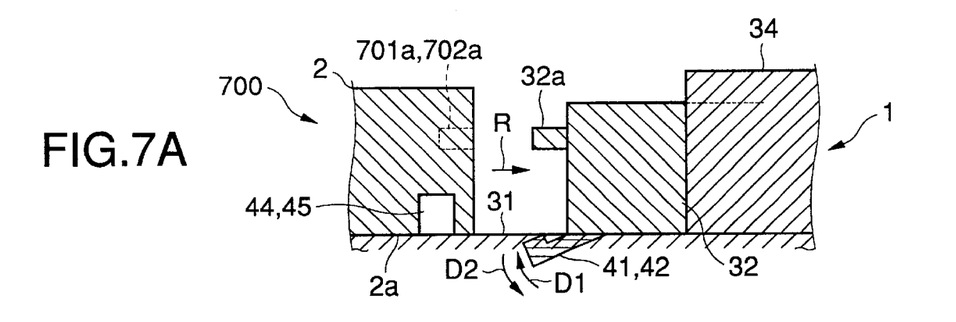
FIGS. 7A through 7D are side views sequentially showing a main body of a computer being docked with a docking unit according to the invention.
Figure 9:
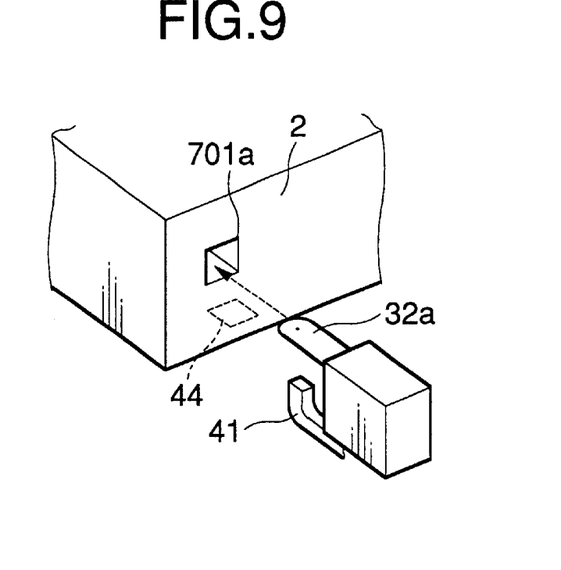
FIG. 9, is a perspective view showing a first engaging member of the docking station and a hole in the main part of the computer.

In FIG. 7A and FIG. 9, the computer body 2 of the computer 700 has been placed on the base part 31. In this state, the guides 32a, 32a of the positioning means 32, 32 project toward the computer body 2 from inside the projecting part 34 of the docking station 1. The first engaging member 41 and the second engaging member 42 are withdrawn in the direction D2 into the base part 31. When as shown in FIG. 7A the computer body 2 of the computer 700 has been placed on the base part 31, the projecting part 31c of FIG. 2 is fitted into the positioning hole 39 in the bottom face 2a of the computer body 2. FIG. 8 shows an example of the projecting part 31c and the positioning hole 39 in the bottom face 2a of the computer body 2. The positioning hole 39 has a wide part 39a and a narrow part 39b, and when the computer body 2 is positioned on the base part 31 as shown in FIGS. 7A, 7B and 7C the projecting part 31c is positioned in the wide part 39a of the positioning hole 39, but when as shown in FIG. 7D the computer body 2 has been completely positioned against the projecting part 34 of the docking station 1 and locked there, i.e. when the computer 700 has been completely docked with the docking station 1, the projecting part 31c is completely fitted in and held by the narrow part 39b.

Figure 7B:
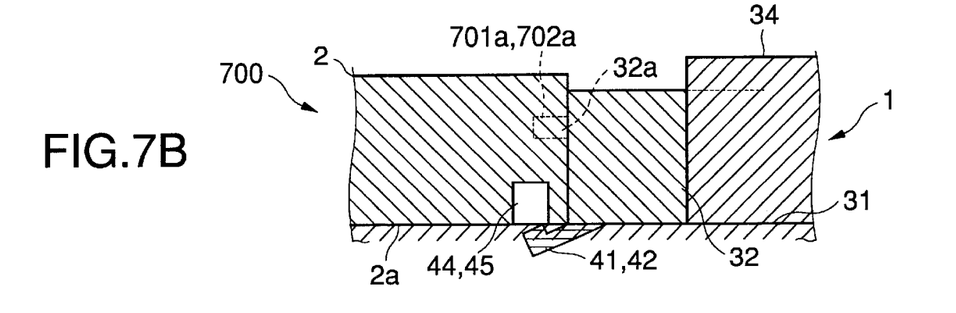
Figure 7C:
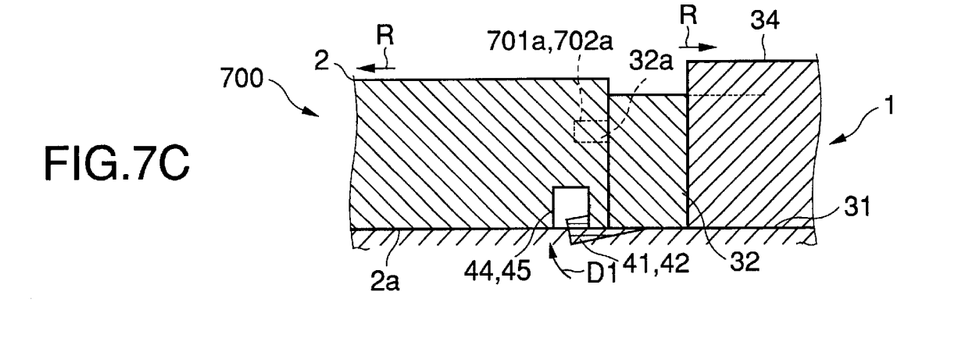
Figure 7D:
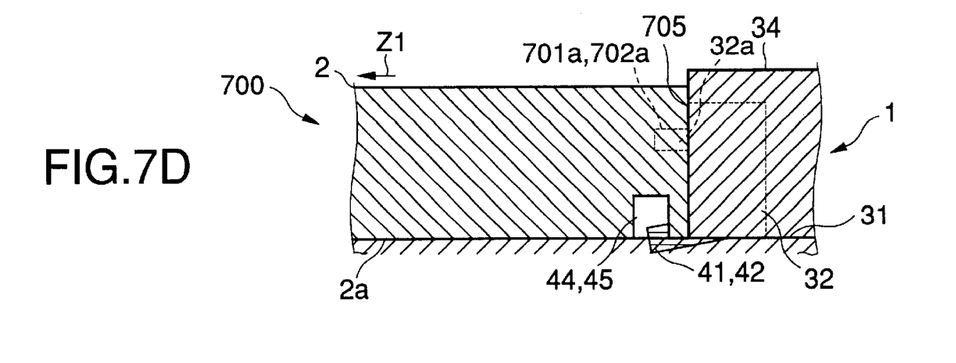

Returning to FIG. 7A, when an operator starts to move the computer body 2 over the base part 31 in the Z direction, preferably at this time the projecting part 31c is guided along the wide part 39a of the positioning hole 39 shown in FIG. 8, and the projecting guides 32a, 32a have been firmly fitted in the holes 701a, 702a respectively of the computer body 2 as shown from, FIG. 7A to FIG. 7B. In this way, the computer body 2 can be guided over the base part 31 in the R direction at three points, by the two guides 32a, 32a and the projecting part 31c on the base part 31 side.

Next, when as shown in. FIG. 7C the operator pushes the computer body 2 further in the Z direction, the positioning means 32, 32 are pushed into the projecting part 34 against the resistance of urging means (not shown), and together with this the first engaging member 41 and the second engaging member 42 are gradually lifted in the direction D1. As shown in FIG. 7D, when the rear end part 705 of the computer body 2 is substantially in contact with the front end face of the projecting part 34, the first engaging member 41 and the second engaging member 42 have been fitted firmly into the holes 44, 45 of the computer body 2. Simultaneously with this, the projecting part 31c on the base part 31 side shown in FIG. 8 fits completely into the narrow part 39b of the positioning hole 39 of the computer body 2. Thus, the computer body 2 can be kept firmly fixed (locked) in position on the docking station 1 side at the three points that are the first engaging member 41, the second engaging member 42 and the projecting part 31c. In the reverse of this, by proceeding from FIG. 7D to FIG. 7A, the operator can remove the computer body 2 in the direction R1 from the base part 31 of the docking station 1.

Next, removal from the locked state in this portable electronic device docking unit will be explained. As shown in FIGS. 7A through 7D, the computer body 2 can be kept held (locked) to the docking station 1, but when the portable computer 700 is to be undocked, in the following kinds of case, the lock is prevented from being released until processing for this undocking is finished and only when processing for this undocking is finished is the computer body 2 allowed to be removed from the docking station 1. The reason for this is that if this is not done then processing in the computer 700 is interrupted. Case (1): By the operator giving an instruction of finishing of processing for undocking of the computer 700 in the computer 700, on the basis of a command from the portable computer 700, the computer body 2 is removed from the docking station 1 without the operation of the computer 700 being affected and the connectors 35, 36 of FIG. 2 are thereby disconnected. Case (2): When during operation of the computer 700 the operator has accidentally touched the operating lever 40 of the operating means 33 of FIG. 2, shut down processing is displayed on the screen of the display means on the computer 700 side and processing to shut down the operation of the computer 700 is carried out and then the computer body 2 is removed from the docking station 1 without the operation of the computer 700 being affected and the connectors 35, 36 of FIG. 2 are thereby disconnected.

A lock releasing mechanism 440 of the portable electronic device docking unit of the invention is shown in FIG. 3 and FIG. 5, and this releasing mechanism 440 includes the operating means 33, the solenoid 50 serving as an actuator, a switch 77 and the CPU 51. The switch 77 is disposed in the docking station 1 for example in the vicinity of the member 55 as shown in FIG. 5. This switch 77 is connected to the CPU 51, as shown in FIG. 3. When the member 55 of FIG. 5 moves in the direction S2 it switches the switch 77 off, and a corresponding signal is fed to the CPU 51 and the CPU 51 switches the solenoid 50 off. When the solenoid 50 is thus switched off the moving piece 61 of FIG. 5 releases the member 55 and consequently the first engaging member 41 and the second engaging member 42 connected by the connecting member.43 simultaneously withdraw in the direction D2. By this means the first engaging member 41 and the second engaging member 42 are withdrawn from the holes 44, 45 of the computer body 2 as shown in FIGS. 7D, 7C and 7B.

Figure 10:
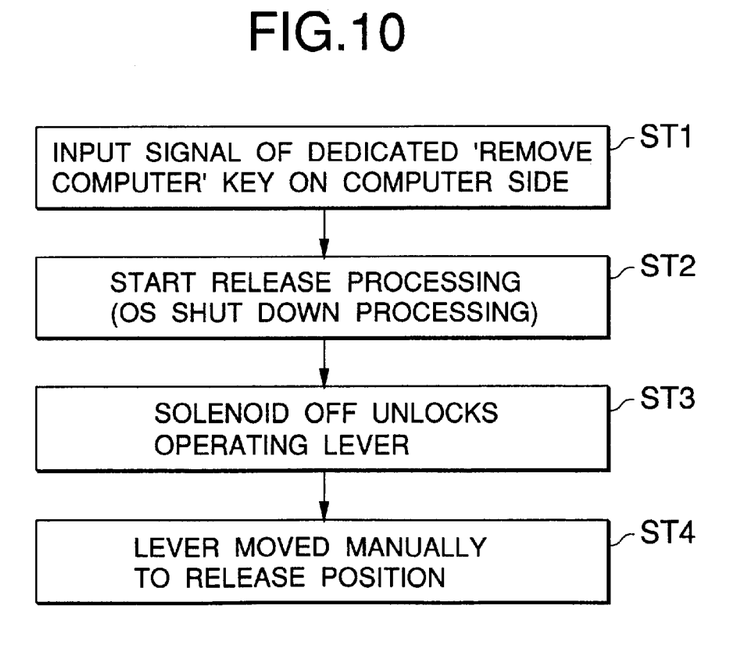
FIG. 10 is a flow chart showing an example of an operation for releasing a locked state of a computer when an. operator has pressed a: key indicating that the computer is to be removed.

The flow chart of FIG. 10 shows a case wherein an operator wants to remove the computer 700 from the docking station 1 in the case (1) described above. In a step ST1 of FIG. 10, for example by pressing a dedicated key or a combination of keys of the keyboard 11 of the computer 700 the operator sends to the CPU 81 of FIG. 3 and the CPU 51 of the docking station 1 a signal indicating that the computer 700 is to be removed. On the basis of this, in the computer 700 release processing (shut down processing of the OS (Operating System)) is started, as shown in step ST2. Then in step ST3, the CPU 51 of the docking station 1 switches the solenoid 50 off and thereby enables the operator to manually move the operating lever of FIG. 5 from the hold position HP (also called the lock position) to the release position P. As a result of the operator moving the operating lever 40 of FIG. 2 and FIG. 5 in the direction S2 the operating lever 40 moves from its hold position HP to its release position P and consequently the first engaging member 41 and the second engaging member 42 are withdrawn in the direction D2 from the holes 44, 45 of the computer body 2 as shown by FIG. 7D to FIG. 7B (Step ST4).

The operator can then disengage the computer 700 from the docking station 1 by moving it in the direction R1, opposite to the direction R, of FIG. 2. In this case, although for ergonomical reasons the base part 31 of FIG. 2 is sloping, because the projecting part 31*c* guides the positioning hole 39 of the computer body 2 and also the projecting part 31*c* abuts with the end of the positioning hole 39, there is no risk of the whole of the computer body 2 of the computer 760 slipping off the base part 31.

Figure 11:
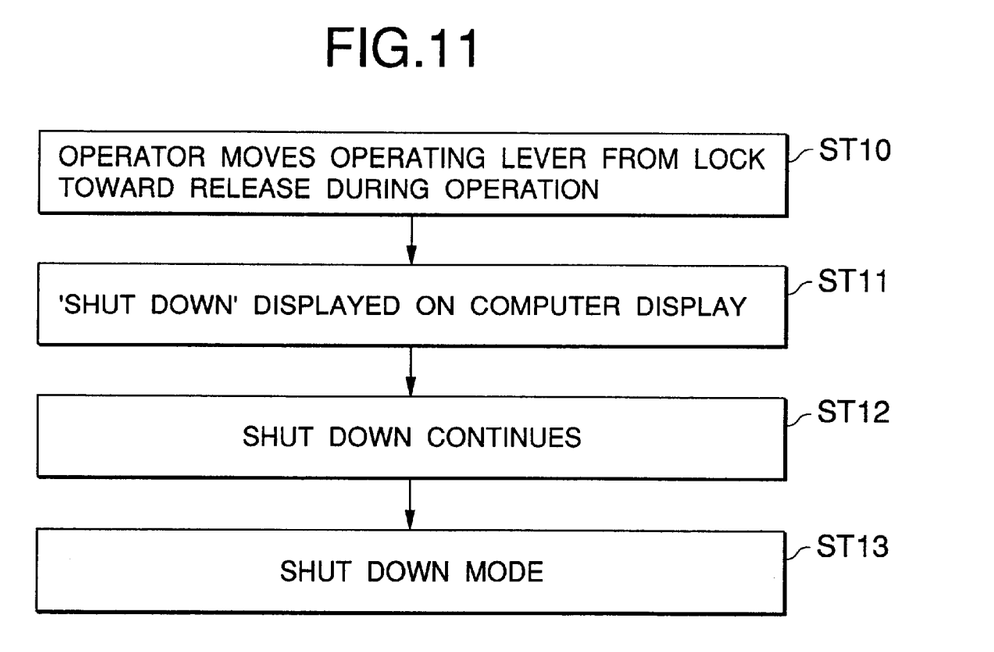
FIG. 11 is a flow chart showing an example of an operation for releasing a locked state of a computer when an operator has accidentally moved an operating lever while working.

Next, the flow chart of FIG. 11 shows a case wherein while working the operator has accidentally moved the operating lever 40 from is lock position to its release position. For example, the operator has touched the operating lever 40 of FIG. 5 and accidentally moved the operating lever 40 slightly from the hold position HP to the release position P (Step ST10). In this case, the switch 77 of FIG. 5 is turned off by the slight movement of the member 55, and in response to the switch 77 thus being turned off the CPU 51 sends an instruction to the CPU 81 of the computer body 2 on the basis of which as shown in step ST11 shut down processing is displayed on the display screen of the display means 3 of the computer 700. Then, in step ST12 the operator proceeds with shut down processing on the computer 700 and in step ST13 the computer 700 goes into shut down mode. After the processing of the computer 700 is thereby ended, the computer 700 can be removed from the docking station 1. Thus even when an operator wants to remove the computer 700 from the docking station 1 or has accidentally touched the operating lever 40 the work in progress on the computer 700 is not greatly affected.

Figure 6:
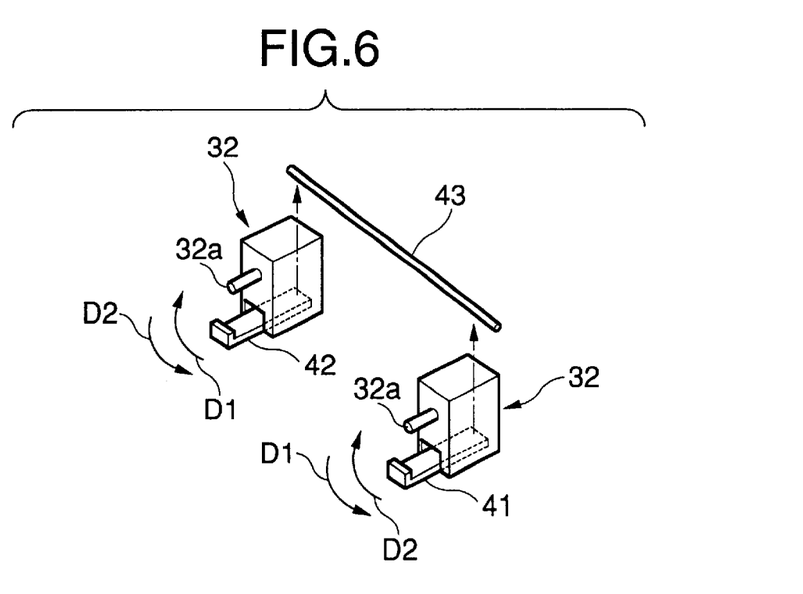
FIG. 6 is a perspective view of first and second engaging members and a connecting member shown in FIG. 5.

The invention is not limited to the preferred embodiment described above. For example, although in the preferred embodiment described above a so-called portable computer was used as an example of a portable electronic device, the invention is not limited to this and includes docking units for other types of device, for example information terminals and video/audio devices. And although the first engaging member 41 and the second engaging member 42 shown in FIG. 5 and FIG. 6 are mechanically connected by a connecting member 43, the invention is not limited to this and alternatively the first engaging member 41 and the second engaging member 42 may each be provided with a operating lever 40 of the kind shown in FIG. 5 and have their engagement released individually. And the holding of the engaged state of the first engaging member 41 and the second engaging member 42 does not have to be effected using a solenoid 50 as the actuator and other types of actuator can of course be employed. And although the base part 31 of the docking station 1 is inclined at an angle θ to the bottom face 31*a* as shown in FIG. 2 the base part 31 may alternatively be horizontal.

What is claimed is:

1. A docking unit for having a portable electronic device engageably/disengageably set thereon and electrically connecting said portable electronic device to an external device, said docking unit comprising:

an actuator, said actuator preventing the manual removal of said portable electronic device from said docking unit until said portable electronic device completes shut-down processing of applications being processed by said portable electronic device; and a base part for supporting said portable electronic device, said base part being tilted from a horizontal position.

2. The docking unit according to claim 1, wherein said portable electronic device is a portable computer.

3. The docking unit according to claim 1, wherein said actuator is a solenoid.

4. The docking unit according to claim 1, further comprising:

an engaging member, said engaging member holding said portable electronic device against said docking unit; and a positioning member, positioning member positioning said engaging member to hold said portable electronic device against said docking unit.

5. The docking unit according to claim 4, wherein said engaging member engaging a rear portion of said portable electronic device.

6. The docking unit according to claim 1, further comprising:

a processor, said processor sending an indication to said actuator that said shut-down processing is complete.

7. The docking unit according to claim 6, further comprising:

a switch, said switch sending an indication to said processor that said portable electronic device is to be removed from said docking unit.

8. The docking unit according to claim 6, wherein said processor receives an indication from said portable electronic device that said portable electronic device can be removed from said docking unit.

9. The docking unit according to claim 6, wherein said indication from said portable electronic device is a user input.

10. The docking unit according to claim 1, wherein said base part is tilted about 7.5 degrees from said horizontal position.

11. The docking unit according to claim 1, wherein said base part includes a projecting part, said projecting part engaging a positioning hole located on the front bottom surface of said portable electronic device.

12. A docking unit for having a portable electronic device engageably/disengageably set thereon and electrically connecting said portable electronic device to an external device, said docking unit comprising:

an engaging member, said engaging member holding said portable electronic device against said docking unit;

a positioning member, positioning member positioning said engaging member to hold said portable electronic device against said docking unit;

an actuator, said actuator preventing the manual removal of said portable electronic device from said docking unit until said portable electronic device completes shut-down processing of applications being processed by said portable electronic device;

a processor, said processor sending an indication to said actuator that said shut-down processing is complete; and a base part for supporting said portable electronic device, said base part being tilted from a horizontal position.

13. The docking unit according to claim 12, further comprising:

a switch, said switch sending an indication to said processor that said portable electronic device can be removed from said docking unit.

14. The docking unit according to claim 12, wherein said processor receives an indication from said portable electronic device that said portable electronic device is to be removed from said docking unit.

15. The docking unit according to claim 14, wherein said indication from said portable electronic device is a user input.

16. The docking unit according to claim 12, wherein said base part is tilted about 7.5 degrees from said horizontal position.

17. The docking unit according to claim 12, wherein said base part includes a projecting part, said projecting part engaging a positioning hole located on the front bottom surface of said portable electronic device.

18. A docking unit for having a portable electronic device engageably/disengageably set thereon and electrically connecting said portable electronic device to an external device, said docking unit comprising:

an actuator, said actuator preventing the manual removal of said portable electronic device from said docking unit until said portable electronic device completes shut-down processing of applications being processed by said portable electronic device; and a base part for supporting said portable electronic device, said base part including a projecting part, said projecting part engaging a positioning hole located on the front bottom surface of said portable electronic device.

19. The docking unit according to claim 18, wherein said portable electronic device is a portable computer.

20. The docking unit according to claim 18, wherein said actuator is a solenoid.

21. The docking unit according to claim 18, further comprising:

an engaging member, said engaging member holding said portable electronic device against said docking unit; and a positioning member, positioning member positioning said engaging member to hold said portable electronic device against said docking unit.

22. The docking unit according to claim 21, wherein said engaging member engaging a rear portion of said portable electronic device.

23. The docking unit according to claim 18, further comprising:

a processor, said processor sending an indication to said actuator that said shut-down processing is complete.

24. The docking unit according to claim 23, further comprising:

a switch, said switch sending an indication to said processor that said portable electronic device is to be removed from said docking unit.

25. The docking unit according to claim 23, wherein said processor receives an indication from said portable electronic device that said portable electronic device can be removed from said docking unit.

26. The docking unit according to claim 23, wherein said indication from said portable electronic device is a user input.

27. A docking unit for having a portable electronic device engageably/disengageably set thereon and electrically connecting said portable electronic device to an external device, said docking unit comprising:

an engaging member, said engaging member holding said portable electronic device against said docking unit;

a positioning member, positioning member positioning said engaging member to hold said portable electronic device against said docking unit;

an actuator, said actuator preventing the manual removal of said portable electronic device from said docking unit until said portable electronic device completes shut-down processing of applications being processed by said portable electronic device;

a processor, said processor sending an indication to said actuator that said shut-down processing is complete; and a base part for supporting said portable electronic device, said base part including a projecting part, said projecting part engaging a positioning hole located on the front bottom surface of said portable electronic device.

28. The docking unit according to claim 27, further comprising:

a switch, said switch sending an indication to said processor that said portable electronic device can be removed from said docking unit.

29. The docking unit according to claim 27, wherein said processor receives an indication from said portable electronic device that said portable electronic device is to be removed from said docking unit.

30. The docking unit according to claim 29, wherein said indication from said portable electronic device is a user input.

* * * * *